L. S. ROBBINS.
Process for Purifying Butter.
No. 80,506.
Patented July 28, 1868.
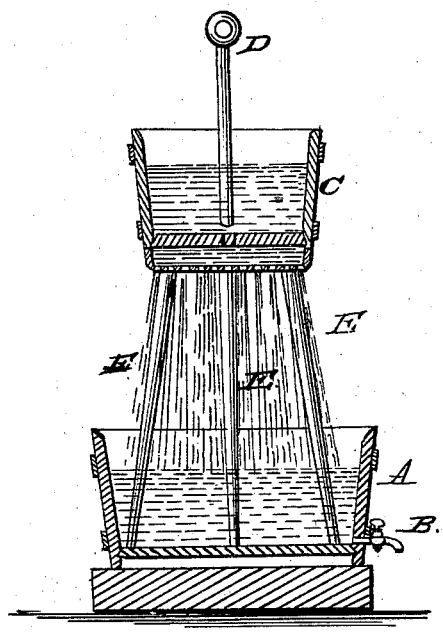
Witnesses
M. Robbins
W. P. Hotchkiss
Inventor:
Louis S. Robbins

UNITED STATES PATENT OFFICE.

LOUIS S. ROBBINS, OF NEW YORK, N. Y.

IMPROVED PROCESS FOR PURIFYING BUTTER.

Specification forming part of Letters Patent No. 80,506, dated July 28, 1868.

*To all whom it may concern:*

Be it known that I, LOUIS S. ROBBINS, of the city, county, and State of New York, have invented a new and Improved Process for Purifying Butter; and I do hereby declare that the following is a full and clear description thereof, which will enable those skilled in the art to make and use the same, special reference being had to the accompanying drawings, forming part of this specification.

It is a well-known fact that when butter is removed from the churn a greater or less quantity of buttermilk is mixed with and held in combination with it, and that unless the same be removed the butter deteriorates, and becomes rancid and unfit for use. Hitherto, working the butter by hand, or some mechanical device, has been the means employed to remove the buttermilk from it; but, owing to the nature of the butter, this mode of operating but partially accomplishes the object. To remove the buttermilk and other impurities from the butter, and thereby prevent its rancidity and deterioration, is, therefore, the object of the present invention, and this object is accomplished thereby.

The method consists in subjecting the butter to such a temperature as will reduce it to a semi-liquid condition, then washing it with warm, and afterward with cold, water, in such a manner as will remove and precipitate the buttermilk and other impurities, and solidify or harden the butter to any desired degree, according to the temperature of the water employed for the purpose.

One form of apparatus for carrying out my improved process is represented by the accompanying plate.

A in the drawing represents a tub or vessel of any suitable size, which is to be partly filled with water, previously heated to a temperature of about 100° Fahrenheit, varying the heat according to the temperature of the surrounding atmosphere; but it is not safe to raise the temperature of the water above 100° of heat, as it might injuriously affect the result of the operation.

B represents a faucet used for drawing off the warm and cold water during and after the operation.

C represents a tub or vessel one size smaller than that represented by A, and is constructed with two bottoms, the lower one of which is perforated with small holes, for the purposes as hereinafter specified.

D is a plug fitted to the upper bottom of tub C.

E E E represent three uprights, properly arranged, and upon which is placed tub C, directly over tub A.

A sufficient quantity of water, heated to a proper temperature, is now introduced into tub A, and the butter to be treated placed therein, which is allowed to remain a sufficient time to assume a semi-liquid condition, when plug D, situated in tub C, which has been previously filled with a sufficient quantity of water of the same temperature as that contained in tub A, is withdrawn, and the water allowed to flow through the perforated bottom in the form of a shower-bath, into and through the butter contained in tub A, removing the buttermilk and other impurities contained therein. Then a larger portion of the water is withdrawn from tub A. Tub C is then filled with cold water, which is allowed to pass through, in the same manner, into the butter, which it solidifies and hardens to any required degree, according to the temperature of the water, when the operation is completed.

The butter is then to be salted, when it is ready to be used or put up for the market.

I do not intend to limit myself to any particular form of apparatus, as there are various ways in which a similar result can be accomplished with the use of hot and cold water; but What I do claim as new, and desire to secure by Letters Patent, is—

The within-described process for treating or purifying butter, substantially as herein described.

LOUIS S. ROBBINS.

Witnesses:
M. ROBBINS,
W. B. HOTCHKISS.